United States Patent
Rivers

(10) Patent No.: US 8,798,058 B2
(45) Date of Patent: Aug. 5, 2014

(54) PROVIDING FIBRE CHANNEL SERVICES AND FORWARDING FIBRE CHANNEL OVER ETHERNET FRAMES

(75) Inventor: James Paul Rivers, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 829 days.

(21) Appl. No.: 12/722,431

(22) Filed: Mar. 11, 2010

(65) Prior Publication Data
US 2010/0232419 A1   Sep. 16, 2010

Related U.S. Application Data

(60) Provisional application No. 61/159,603, filed on Mar. 12, 2009.

(51) Int. Cl.
*H04L 12/721* (2013.01)
*H04L 12/54* (2013.01)
*H04L 12/56* (2006.01)

(52) U.S. Cl.
CPC .............. *H04L 12/56* (2013.01); *H04L 49/357* (2013.01); *H04L 49/351* (2013.01)
USPC .......................................... 370/392; 370/389

(58) Field of Classification Search
CPC ............ H04L 67/1097; H04L 67/1002; H04L 49/351; H04L 49/356; H04L 49/357; H04L 49/358; H04L 12/4265; H04L 12/4633; H04L 45/04; H04L 69/22; H04L 61/6045
USPC .................................................. 370/389, 392
See application file for complete search history.

(56) References Cited

U.S. PATENT DOCUMENTS

| | | | |
|---|---|---|---|
| 7,197,047 B2 * | 3/2007 | Latif et al. | 370/466 |
| 7,564,869 B2 * | 7/2009 | Cafiero et al. | 370/466 |
| 7,917,682 B2 * | 3/2011 | Bakthavathsalam | 710/315 |
| 8,108,454 B2 * | 1/2012 | Snively et al. | 709/200 |
| 8,321,908 B2 * | 11/2012 | Gai et al. | 726/1 |
| 2003/0088683 A1 * | 5/2003 | Kitamura et al. | 709/230 |
| 2003/0152182 A1 * | 8/2003 | Pai et al. | 375/372 |
| 2003/0159058 A1 * | 8/2003 | Eguchi et al. | 713/193 |
| 2004/0172494 A1 * | 9/2004 | Pettey et al. | 710/305 |
| 2006/0193327 A1 * | 8/2006 | Arndt et al. | 370/395.21 |
| 2007/0079098 A1 * | 4/2007 | Kitamura | 711/170 |

(Continued)

FOREIGN PATENT DOCUMENTS

WO   WO-2010/105092 A1   9/2010

OTHER PUBLICATIONS

International Application Serial No. PCT/US2010/027036, Search Report mailed Jun. 8, 2010, 6 pgs.

(Continued)

*Primary Examiner* — Wutchung Chu
(74) *Attorney, Agent, or Firm* — Schwegman, Lundberg & Woessner, P.A.

(57) ABSTRACT

In one embodiment, an apparatus may include a first interface configured to be communicatively coupled, via a network, to a second interface and a fiber channel services module. The first interface may be configured to receive a fiber channel service from the fiber channel services module, establish communication with the second interface, and communicate a fiber-channel-over-Ethernet (FCoE) frame to the second interface, via a forwarder that forwards the FCoE frame without employing a fiber channel switching element. Other embodiments are described and claimed.

25 Claims, 7 Drawing Sheets

(56) References Cited

U.S. PATENT DOCUMENTS

| | | | |
|---|---|---|---|
| 2008/0028096 A1* | 1/2008 | Henderson et al. | 709/236 |
| 2008/0159277 A1* | 7/2008 | Vobbilisetty et al. | 370/357 |
| 2009/0037977 A1* | 2/2009 | Gai et al. | 726/1 |
| 2009/0245242 A1* | 10/2009 | Carlson et al. | 370/386 |
| 2009/0245791 A1* | 10/2009 | Thaler et al. | 398/45 |
| 2009/0254677 A1* | 10/2009 | Desanti | 709/242 |
| 2009/0292813 A1* | 11/2009 | Snively et al. | 709/228 |
| 2010/0017497 A1* | 1/2010 | Brown et al. | 709/217 |
| 2010/0125857 A1* | 5/2010 | Dommeti et al. | 719/326 |

OTHER PUBLICATIONS

International Application Serial No. PCT/US2010/027036, Written Opinion mailed Jun. 8, 2010, 6 pgs.

Ko, M, "A Case for Convergence Enhanced Ethernet : Requirements and Applications", Proceedings of ICC 2008: IEEE International Conference on Communications, IEEE, Picataway, NJ, (May 19, 2008), 5702-5707.

"International Application Serial No. PCT/US2010/027036, International Preliminary Report on Patentability mailed Sep. 22, 2011", 6 pgs.

* cited by examiner

PROVIDING FIBRE CHANNEL SERVICES AND FORWARDING FIBRE CHANNEL OVER ETHERNET FRAMES

PRIORITY CLAIM

This non-provisional patent application claims the benefit of the filing date of U.S. Provisional Patent Application Ser. No. 61/159,603, filed Mar. 12, 2009, and entitled, "SYSTEMS AND METHODS FOR PROVIDING FIBRE CHANNEL SERVICES," the content of which is incorporated by reference herein.

TECHNICAL FIELD

The present disclosure relates generally to network communication and, more particularly but not by way of limitation, to providing fibre channel ("FC") services and forwarding FC over Ethernet ("FCoE") frames in an FCoE network.

BACKGROUND

Ethernet is a packet-based networking technology. Fibre channel is a high-speed networking technology.

BRIEF DESCRIPTION OF THE DRAWINGS

The drawings illustrate generally, by way of example, but not by way of limitation, various embodiments discussed in this document. In the drawings, the same reference numerals are used to indicate the same or similar features unless otherwise indicated.

DESCRIPTION OF EXAMPLE EMBODIMENTS

Figure 1:
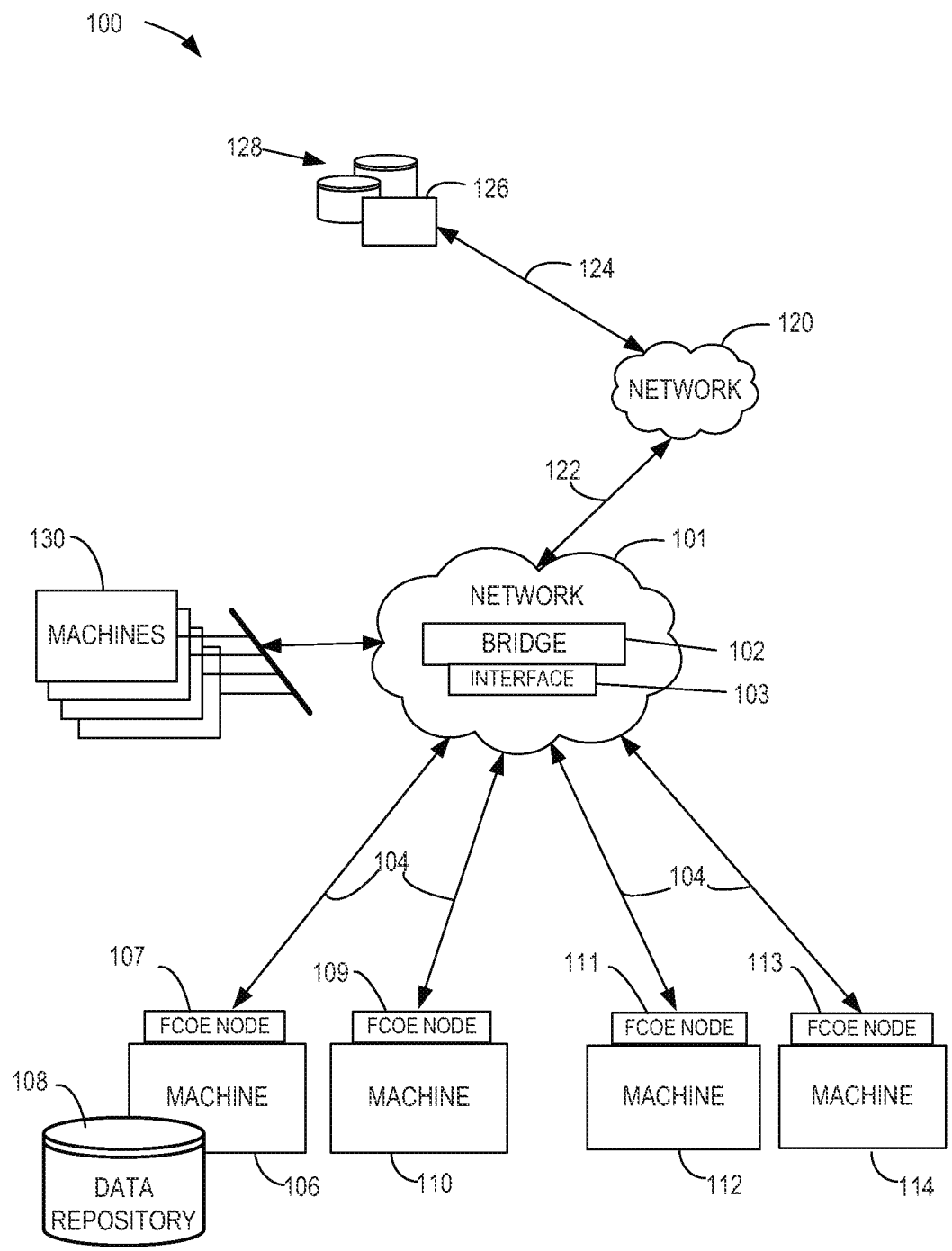
FIG. 1 is a block diagram illustrating a system for providing FC services, in accordance with an example embodiment.

The following detailed description includes references to the accompanying drawings, which form a part of the detailed description. The drawings show, by way of illustration, example embodiments in which the claimed subject matter may be practiced.

Overview

This overview is intended to provide an overview of subject matter disclosed herein. The overview is not intended to provide an exclusive or exhaustive explanation of the subject matter to be disclosed.

Example embodiments relate to systems and methods for providing FC services and forwarding FCoE frames. An example apparatus may include a first interface configured to be communicatively coupled, via a network, to a second interface and a fibre channel (FC) services module. The first interface may be configured to receive an FC service from the FC services module, establish communication with the second interface, and communicate an FC over Ethernet (FCoE) frame to the second interface, via a forwarder that forwards the FCoE frame without employing an FC switching element.

Example Embodiments

The example embodiments relate to communication between interfaces over a network, such as an Ethernet network, using an FCoE communication protocol. The FCoE communication protocol includes FCoE frames, which encapsulate FC frames within Ethernet frames. Interfaces that transmit and receive FCoE frames are referred to herein as "FCoE nodes" and are also considered to be "FC nodes" (e.g., nodes belonging to an FC domain).

In the example embodiments discussed below, the acronyms FC, FCoE, and ID, as indicated above, refer to "fibre channel", "fibre channel over Ethernet", and "identification", respectively. The acronyms FC, FCoE, and ID are used accordingly in the descriptions below. Media access control ("MAC") is also referred to herein by acronym. Although acronyms may be initially indicated for additional subject matter, the additional subject matter is referred to herein without the use of acronyms.

Example embodiments include systems and methods for allowing FC services such as FC domain login service (e.g., issuing FC IDs to FC nodes such as FCoE nodes), domain name services ("DNS"), state notifications (e.g., registered state name notification ("RSCN")), and FC zoning to be provided by a non-FC switching element. The systems and methods may also allow FCoE frames to be forwarded by an Ethernet bridge (or any other non-FC switching element) that does not provide FC services.

Various example embodiments may operate in a system including multiple FCoE nodes communicatively coupled with one another via an Ethernet network. The FCoE nodes may be associated with an FC services module that provides FC services to FC nodes (e.g., FCoE nodes) associated with an FC domain. As noted above, some of the FC services provided by the FC services module may include issuing FC IDs to FC nodes (e.g., FCoE nodes), domain name service, state notifications, and FC zoning.

In an example embodiment, an FCoE node is configured to receive an FC service from the FC services module and to establish communication with other FCoE nodes. For FC domain login, an FCoE initialization protocol ("FIP") including a fabric login ("FLOGI") command or a fabric discovery ("FDISC") command may be used between an FC services module and one or more FCoE nodes to issue an FC ID. To establish communication with another FCoE node, the FCoE protocol may be used, which may adopt the port login ("PLOGI") command from the FC protocol.

Based on the communication being established, the FCoE node may communicate an FCoE frame to another FCoE node via an Ethernet switch. In some example embodiments, the FCoE frame encodes a source FC ID and a destination FC ID in the source MAC address and the destination MAC address respectively. The embedded FC IDs may allow the enforcement of FC zoning rules by the Ethernet switch.

The example Ethernet switch may forward FCoE frames based on the frames' source and destination MAC addresses.

In example embodiments, the forwarding of FCoE frames may be implemented by the Ethernet switch without the use of an FC switching element and at a different location in the network (e.g., a different network node) than the location at which FC services are provided.

In some example embodiments, the FC services module may be implemented by a machine (e.g., a storage server) coupled to an FCoE end node. The FCoE end node may provide an interface to a storage server that organizes data in storage and provides access to the data (e.g., data stored on hard disks). The stored data may be accessible by other FCoE nodes in the FC domain that are communicatively coupled to the FCoE end node via the Ethernet network.

FCoE nodes that are in the FC domain and communicatively coupled to the FCoE end node may use an FCoE frame to access a logical unit number ("LUN") in data storage. The logical unit number may be associated with a destination FC ID, which may be embedded within the FCoE frame.

These example embodiments, which are also referred to herein as "examples," are described in enough detail to enable those skilled in the art to practice the claimed subject matter. The example embodiments may be combined; other embodiments may be utilized; and structural, logical and electrical changes may be made without departing from the scope of the claimed subject matter. The following detailed description is, therefore, not to be taken in a limiting sense with respect to the scope of the claimed subject matter that is defined by the appended claims and their equivalents.

FIG. 1 is a block diagram illustrating a system 100 for providing FC services, in accordance with an example embodiment. In the example system 100, machines 106, 110, 112, and 114 are shown to be communicatively coupled to a network 101 via FCOE nodes 107, 109, 111, and 113, respectively, and transmission media 104. The machine 106 is shown to be communicatively coupled to a data repository 108. The system 100 is shown to further include a 102 (e.g., an Ethernet bridge) with an interface 103. One or more of the FCOE nodes 107, 109, 111, and 113 may be implemented with hardware (e.g., physical) interfaces, software, or a combination of hardware and software. A plurality of machines 130 may also be coupled to network 101.

Also shown in FIG. 1 is a coupling of the network 101 to a network 120 via transmission media 122. The network 120 is also shown to be coupled to a machine 126 (e.g., a storage server) via transmission media 124, and the machine 126 is shown to be coupled to one or more data repositories 128. In various example embodiments, the network 120 (e.g., a storage area network or "SAN" over FC), the machine 126, and the one or more data repositories 128 (e.g., disk arrays, or the like) may allow one or more of the machines 130 to access data stored in the data repositories 128. In various example embodiments, the machine 126 is an FC device or node that allows one or more of the machines 130 to access block data stored in the data repositories 128, via the FC protocol. For some example embodiments, the data in the repositories 128 is organized in a random array of inexpensive disks ("RAID") arrangement.

Figure 3:
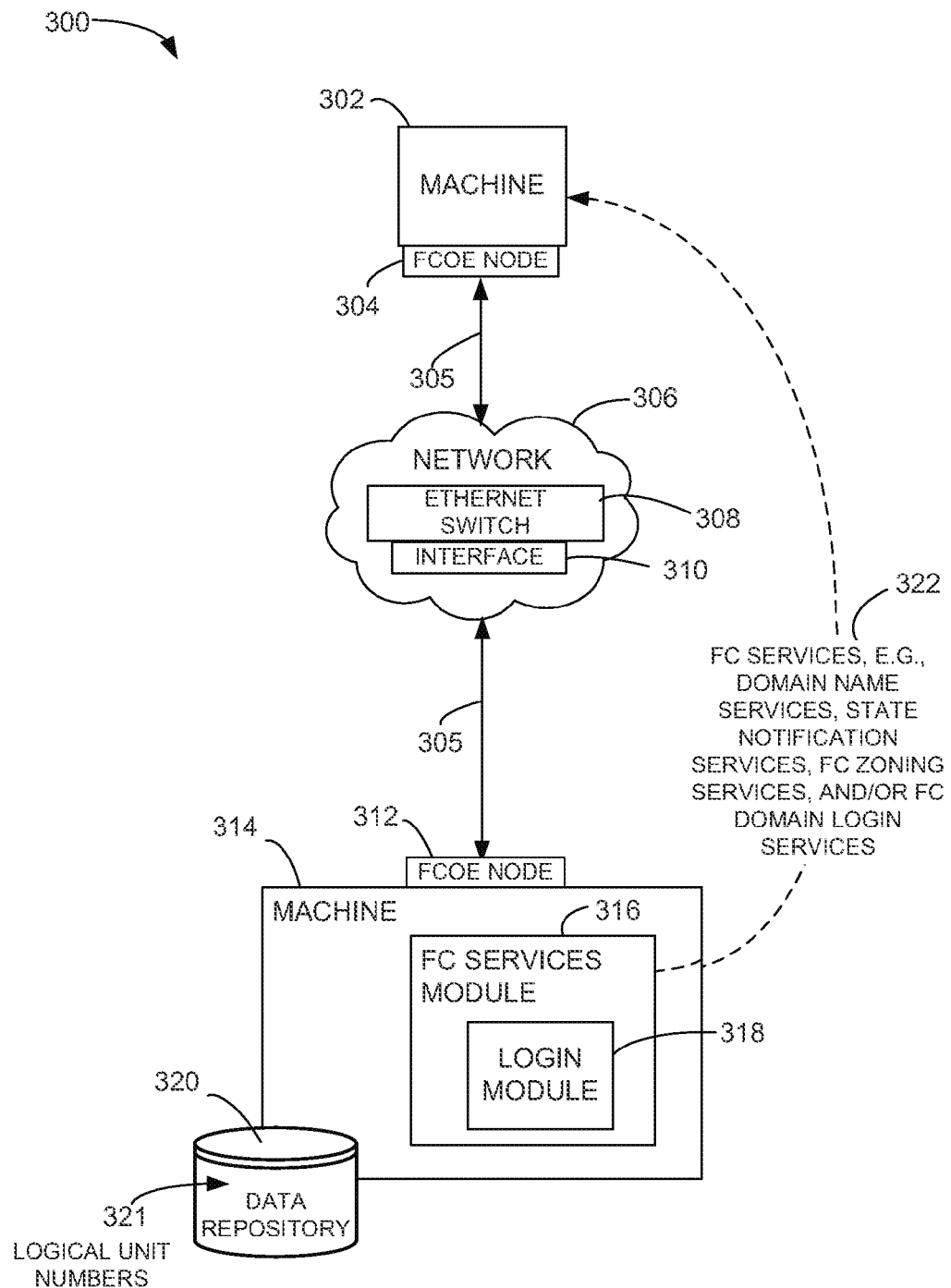
FIG. 3 is a block diagram showing a network connection arrangement coupling machines via an Ethernet network, in accordance with an example embodiment.

In various example embodiments, the expressions "data storage" and "data storage means" may refer to, but not be limited to, data repositories 108 and/or 128 (FIG. 1) and data repository 320 (FIG. 3). Example data storage means include, but are not limited to, any suitable type of volatile or non-volatile storage, including magnetic storage, such as hard disks, floppy disks, magnetic tape, and magneto-optical storage; optical storage, such as optical disks, holographic storage; and three-dimensional storage; semiconductor storage, such as static random access memory ("RAM"), dynamic RAM, read only memory ("ROM"), and flash memory; and biological and/or chemical storage, such as molecular storage.

The network 101 may be a type of Ethernet local area network ("LAN") over which frames transfer between network nodes, such as between the machines 110 and 112 via the bridge 102. In an example embodiment, Internet protocol ("IP") packets of the Internet protocol, Ethernet frames of the Ethernet protocol, and FCoE frames of the FCoE protocol may each be carried over the transmission media 104. The transmission media 104 may include twisted pairs, fiber optic cable, or any other transmission media suitable to carry Ethernet protocol communications.

The bridge 102 may connect multiple network nodes via its interface 103 and the transmission media 104. In example embodiments described below, the bridge 102 is as an Ethernet bridge. The Ethernet bridge 102 may use source and/or destination MAC addresses to provide security, switching, forwarding, flow control, or other Ethernet bridge services to the Ethernet network 101. Some example embodiments of the Ethernet bridge 102 may include a capability to affect frames based on layers other than the MAC layer of the open systems interconnection ("OSI") reference model.

The interface 103 of the Ethernet bridge 102 may include a network interface card ("NIC") to receive and transmit frames. The NIC may process a received frame to determine a MAC address of a source device that sent the frame, and to determine a MAC address of the destination port of the frame. Thus, the interface 103 may be associated with one or more MAC addresses at which frames may be received from other MAC addresses coupled to the network 101.

In an example embodiment, the Ethernet network 101 is implemented in a configuration to reduce frame loss between network nodes. Such a configuration may be referred to as "lossless Ethernet." In example embodiments in which lossless Ethernet is employed, the interfaces connected to the Ethernet network 101 include Ethernet MACs supporting full duplex 2.5-kilobyte jumbo frames over the transmission media 104. The interfaces connected to the Ethernet network 101 may further implement an Ethernet extension, allowing a pause mechanism to avoid Ethernet frame loss due to congestion.

In an example embodiment, the FCoE nodes 107, 109, 111, and 113 are interfaces that are able to communicate using Ethernet protocol and a small computer system interface ("SCSI") protocol.

FCoE protocol encapsulates FC protocol within an Ethernet frame that includes a source MAC address for a source virtual port (e.g., a source FCoE port) and a destination MAC address for a destination virtual port (discussed in more detail below). Each FCoE node may be associated with multiple virtual ports (e.g., multiple FCoE ports). FCoE frames may allow for the transfer of SCSI protocol data over Ethernet.

For some example embodiments, an FCoE node forms outgoing Ethernet frames and parses incoming Ethernet frames to implement the FCoE protocol. The FCoE node may include a physical port that is substantially similar to an Ethernet port. Alternatively or additionally, Ethernet frames may be formed and parsed by software running on a machine.

From the perspective of the Ethernet network 101, the FCoE nodes 107, 109, 111, and 113 are Ethernet nodes, while relative to an FC network (e.g., two or more communicatively coupled FC nodes), the FCoE nodes 107, 109, 111, and 113 are considered to be FC nodes (discussed by way of example in more detail below).

The FCoE nodes 107, 109, 111, and 113 may each be associated with a physical machine (e.g., a microprocessorbased computer) and may interface with one or more operating systems running on the physical machine. In an example embodiment, the physical machine may include one or more central processing units ("CPUs") that execute instructions to implement one or more virtual machines on the physical machine. A virtual machine may execute one or more operating systems that in turn may execute multiple software applications.

In a virtual environment (e.g., a virtual server), a single physical device may present the appearance to other hardware and software that the single physical device comprises multiple logical devices (e.g., multiple virtual devices). Some network devices (e.g., physical devices) include one or more virtual interfaces, each of which connects one or more virtual machines to the network.

Virtual interfaces may allow applications, services, and operating systems to separately access a network through the virtual interfaces using a common physical input/output ("I/O") to the network.

In some example embodiments, one or more of the FCoE nodes 107, 109, 111, and 113 may include one or more virtual ports. A virtual port may serve as an interface between an operating system executed by a physical or virtual machine and the transmission media 104 connected by a physical interface. A virtual link may indicate the use of a non-FC link connecting FCoE ports (e.g., virtual ports). Multiple virtual links between source and destination virtual ports may be formed between a source physical port (e.g., a source physical Ethernet port) and a destination physical port (e.g., a destination physical Ethernet port). As described herein, virtual ports are also referred to as FCoE ports.

In some example embodiments, an FCoE port associated with an FCoE node may be established on the FC network using a fabric login protocol. Once established, the FCoE port may establish communication with other FCoE ports (e.g., a virtual port on a different FCoE node) using, for example, a process login command ("PRLI") or a port login command ("PLOGI"). Transferring a login command such as a fabric login command ("FLOGI") to receive FC services (described in more detail below) may be considered a control operation, while the forwarding of payload data to the network and other network nodes may be considered a data transfer operation.

Figure 2:
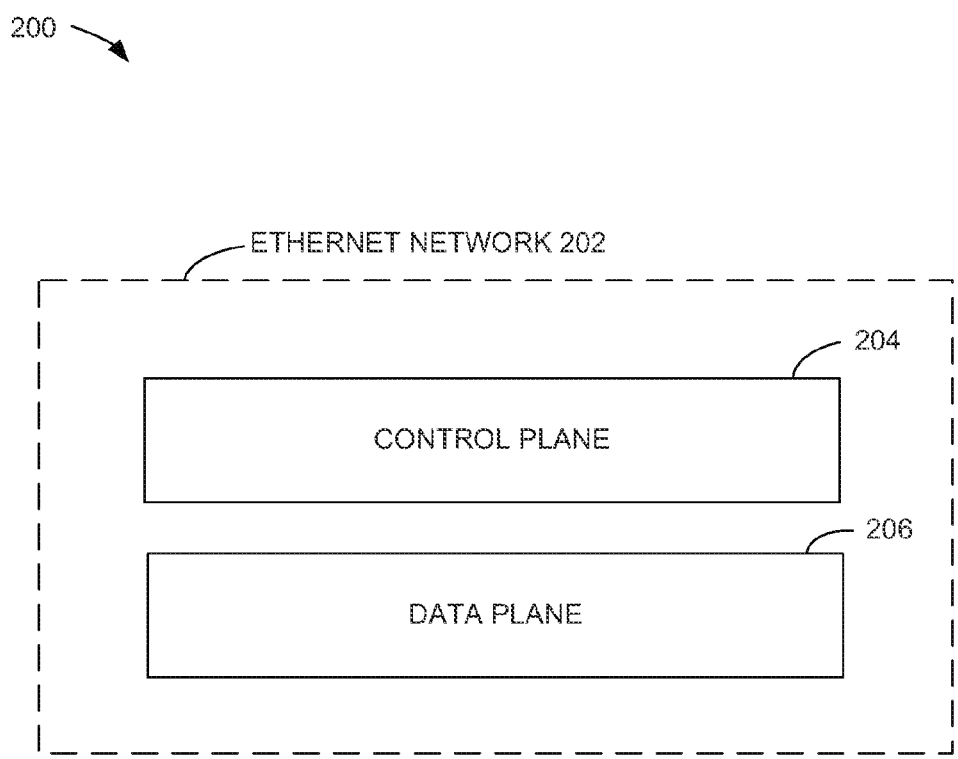
FIG. 2 is a block diagram showing an organization of Ethernet protocol into a control plane and a data plane, in accordance with an example embodiment.

FIG. 2 is a block diagram 200 showing an organization of an Ethernet network 202 into a control plane 204 and a data plane 206, in accordance with an example embodiment. FCoE control operations may occur over the control plane 204, and FCoE data transfer operations may occur over the data plane 206. As explained above, an FCoE node connected to an Ethernet network may be characterized as an FC node in an FC network. Certain control operations, such as the login operations described above, may be associated with an FCoE port at an FC node (e.g., FCoE node 109, FIG. 1) and be carried out over the control plane 204. Some data transfer operations associated with the FCoE port on the FCoE node may be provided by an Ethernet bridge (e.g., the Ethernet bridge 102) over the data plane 206 of the Ethernet network.

In an example embodiment, FC services such as forwarding and security enforcement may be performed on an Ethernet switch (e.g., data plane) rather than by an FC switch (e.g., control and data planes). For example, forwarding may be implemented on an Ethernet device such as a bridge or switch using a filtering database, backward learning and/or spanning trees, and the like. For another example, access control entries derived from FC zoning rules may be enforced at the MAC level on an Ethernet device via access control lists. In an example embodiment, control operations may be initiated at separate times and processed at separate network locations (e.g., on a separate node or machine) than data-forwarding operations. In an example embodiment, an FCoE port associated with an FCoE node is able to log into the network and establish communication with another FCoE port independent of an FC switching element.

FIG. 3 is a block diagram showing a network connection arrangement 300 coupling machines via an Ethernet network 306 in accordance with an example embodiment. The network connection arrangement 300 may represent more example details of features described above, with reference to the system of FIG. 1. The network 306 is shown to include an Ethernet switch 308 and an interface 310 to connect the machines 302 and 314. The machines 302 and 314 are shown to include FCoE nodes 304 and 312, respectively, which connect with transmission media 305, and which may be substantially similar to the FCoE nodes described with respect to FIG. 1. The machine 314 is shown to include an FC services module 316 and is further shown to be coupled to a data repository 320. In an example embodiment, the machine 314 may allow access to the data repository 320, and it may provide FC services to the FCoE node 304.

The FC services module 316 may provide FC services for an FC domain that includes multiple FC nodes. In some example embodiments, the network connection arrangement 300 of FIG. 3 may be viewed as an FC domain. In some example embodiments, instructions to implement the FC services may be ported to the FC services module 316 directly from an FC switch without substantial modification. Some example embodiments may include the FC services module 316 being implemented with hardware or a combination of hardware and software.

The FC services module 316 is shown to include a login module 318, and this may adhere to a particular login protocol such as the FCoE initialization protocol (discussed below by way of example with reference to FIG. 4). The FCoE initialization protocol may be used by the FCoE node 304 and the FC services module 316 to allow fabric login, which includes issuance of an FC ID to an FCoE port instantiated on the FCoE node 304. In an example embodiment, the FC services module 316 performs FC control operations, including the FCoE initialization protocol, while allowing the Ethernet switch 308 or other device to perform data operations including zoning and forwarding services. (FC services 322 will be discussed below in the description of FIG. 5.)

The data repository 320 may store data that may be accessible by the machine 302 and other FC and/or FCoE devices. In some example embodiments, the data repository 320 includes storage disks such as a random array of inexpensive disks ("RAID"). The machine 314 may allow access to, and control the organization of, data in the data repository 320. In some example embodiments, data on the storage disks is organized into logical unit numbers 321 that may be physically dispersed across the example array of disks, but they may appear as logical units that may be individually addressed as such.

In some example embodiments, an FC control plane may be embedded in a data storage area. The data storage area may comprise a plurality of storage arrays, such as data repository 320. Integration of the FC control plane may be done to all or selected storage arrays. In an FC network, each instantiation of a control plane may be identified by a domain ID. Regarding some example embodiments, this results in each storage array owning one domain ID. The number of domain IDs present on an example FCoE network then becomes equal to the number of storage arrays. (It is also possible to have two small storage arrays share a domain ID, and for a large storage array to own two domain IDs.)

During an FCoE initialization protocol ("FIP"), a converged network adaptor ("CNA") may discover all the FC control planes, i.e., all the storage arrays that reply to its FIP solicitation. The CNA may then perform a fabric login ("FLOGI") and/or a discover fabric service parameters ("FDISC") to any storage array containing logic unit numbers ("LUNs") that it needs to reach, potentially to each storage array. The storage array acts as a domain name server ("DNS") and presents to the CNA all the LUNs that the CNA is allowed to access, for example, according to any applicable LUN masking. The CNA may then perform port login ("PLOGI") and process login ("PRLI") to the LUNs it is interested in. In some embodiments, no modifications are needed to the CNA, because the CNA is already capable of login into multiple fibre channel forwarders ("FCFs") or FCoE switches. Software that implements FC services (also referred to as the "control plane") may be readily ported to the storage arrays, where it may optionally be integrated with LUN mapping/masking. Advantages include not having to have dedicated FCF or FC switches in the network and better integration of some FC services, such as zoning, which may be more uniformly implemented across storage arrays.

Although the above description of FIG. 3 has been made regarding a single Virtual Storage Area Network (VSAN), it will be understood that embodiments may comprise multiple VSANs.

Figure 4:
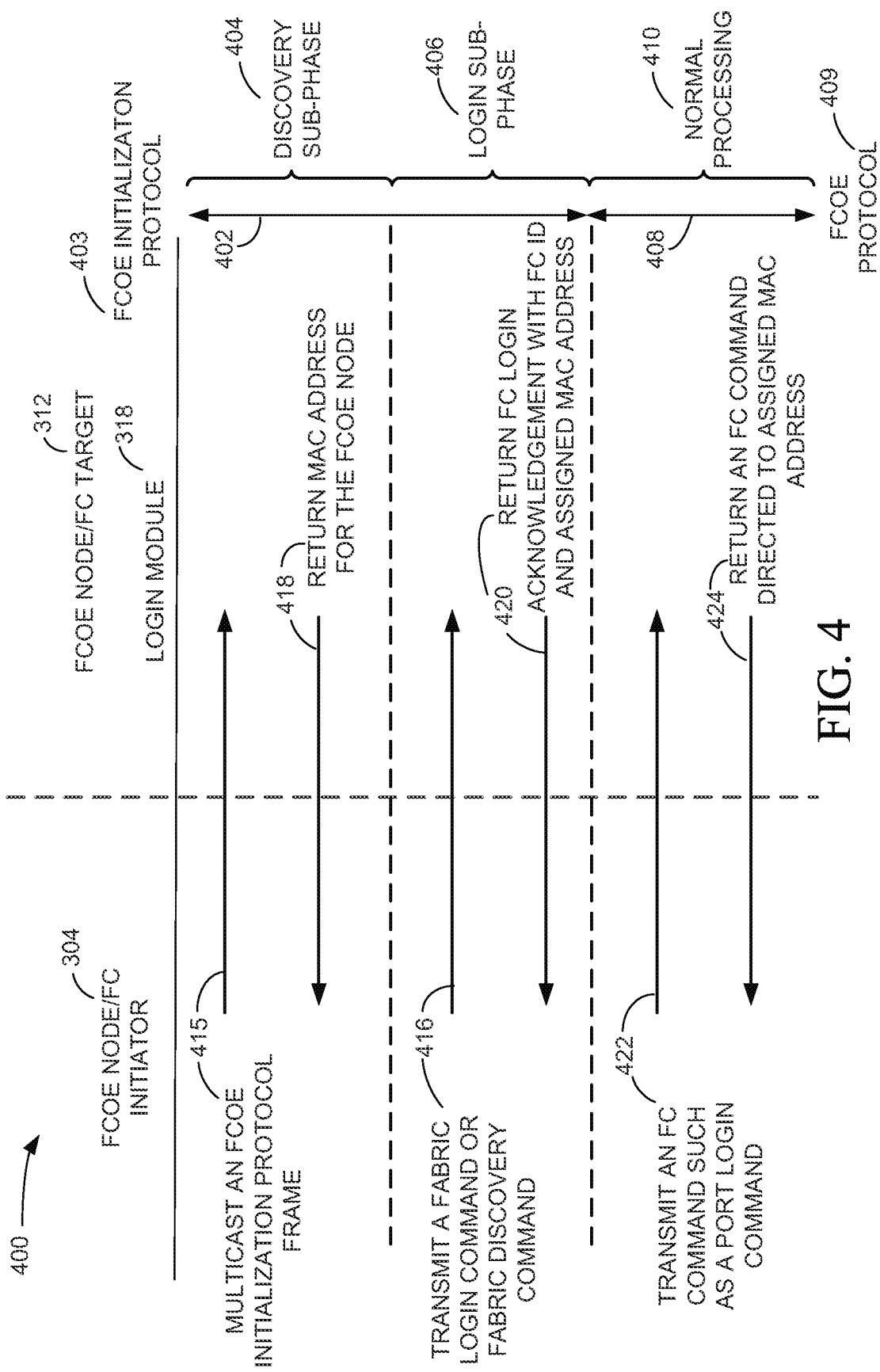
FIG. 4 is an interaction diagram illustrating a domain login method and subsequent communications, in accordance with an example embodiment.

FIG. 4 is an interaction diagram illustrating a domain login method 400 and subsequent communications, in accordance with an example embodiment. The domain login method 400 may be deployed in the network connection arrangement 300 illustrated in FIG. 3 and, accordingly, it is described in FIG. 4, by way of example, with reference to the FCoE node 304, the FCoE node 312, and the login module 318 of FIG. 3.

In a first phase 402 of the domain login method 400, an FC initiator such as the FCoE node 304 logs in with the login module 318 associated with the FCoE node 312 to instantiate an FCoE port on the FCoE node 304. In a second phase 408, virtual links may be established between the instantiated FCoE port of the FCoE node 304 and instantiated FCoE ports of FCoE nodes (e.g., the FCoE node 312) that are communicatively coupled via a transmission media (e.g., the transmission media 305, FIG. 3).

In an example embodiment, the first phase 402 may establish an FCoE port on the FCoE node 304. The first phase 402 of the domain login method 400 may include a discovery sub-phase 404 and a login sub-phase 406. The FCoE node 304 may perform the discovery sub-phase 404 with the login module 318 using FCoE initialization protocol 403. The FCoE initialization protocol 403 is a communication protocol dedicated to controlling connections between FCoE ports. A different ethertype may be indicated in the ethertype field of an Ethernet packet carrying an FCoE initialization protocol, frame (as in operation 415) than in the ethertype field of an Ethernet packet carrying an FCoE frame (as in operation 422), which different ethertypes may allow the FCoE initialization protocol frame and FCoE protocol frame to be distinguished from one another.

The discovery sub-phase 404 allows the FCoE node 304 to directly address the FCoE node 312 associated with the login module 318. In the discovery sub-phase 404, the FCoE node 304 may multicast an FCoE initialization protocol frame (operation 415) soliciting the login module 318 for a MAC address at which the FCoE node 312 and the login module 318 can be addressed. In response, the login module 318 may reply by returning a MAC address for the FCoE node 312 (operation 418).

The login sub-phase 406 may include the FCoE node 304 transmitting a fabric login command or a fabric discovery command (operation 416) to the MAC address of the FCoE node 312 to request the login module 318 to assign an FC ID and a MAC address to the FCoE port being established on the FCoE node 304.

In response, the login module 318 may return a fabric login acknowledgement (operation 420) to accept the request from the FCoE node 304. For various example embodiments, the login module 318 may also return in the response to the fabric login command 416, the requested FC ID and the MAC address assigned to the FCoE port.

Once the FCoE port being established on the FCoE node 304 has been assigned an FC ID, further FC services such as domain name service, registered state name notification, and FC zoning may be provided via the FCoE node 312 to the FCoE node 304.

In some example embodiments, the FCoE node 304 may request a specific MAC address for an FCoE port by including the specific MAC address in the fabric login command (operation 416). The specific MAC address may be referred to as a server-provided MAC address ("SPMA"). In some example embodiments, the login module 318 uses the server-provided MAC address as the assigned FCoE MAC address. In other example embodiments, the login module 318 instead defines the assigned MAC address (e.g., a fabric provided MAC address ("FPMA")) based on an assigned 24-bit FC ID (e.g., a 24-bit organizationally unique identifier (e.g., OUI) concatenated with the 24-bit FC ID in a 48-bit MAC address).

When the login module 318 has assigned the FC ID and the MAC address, an FCoE port is instantiated on the FCoE node 304. For each FCoE port instantiated on the FCoE node 304, the login module 318 instantiates an FCoE port for the FCoE node 312. A virtual link may be formed between an FCoE port on the FCoE node 304 and a corresponding FCoE port instantiated on the FCoE node 312.

The second phase 408 may include normal FC processing 410 in which the FCoE node 304 transmits an FC command (operation 422) through its instantiated FCoE port (e.g., port login/process login commands), using the FCoE protocol 409, to establish virtual links with target FCoE ports on one or more FCoE nodes (e.g., the FCoE node 312). When an FCoE port of the FCoE node 312 responds to the FCoE port of the FCoE node 304, the FCoE port of the FCoE node 312 may return an FC command directed to the MAC address assigned to the FCoE port of the FCoE node 304 (operation 424).

Figure 5:
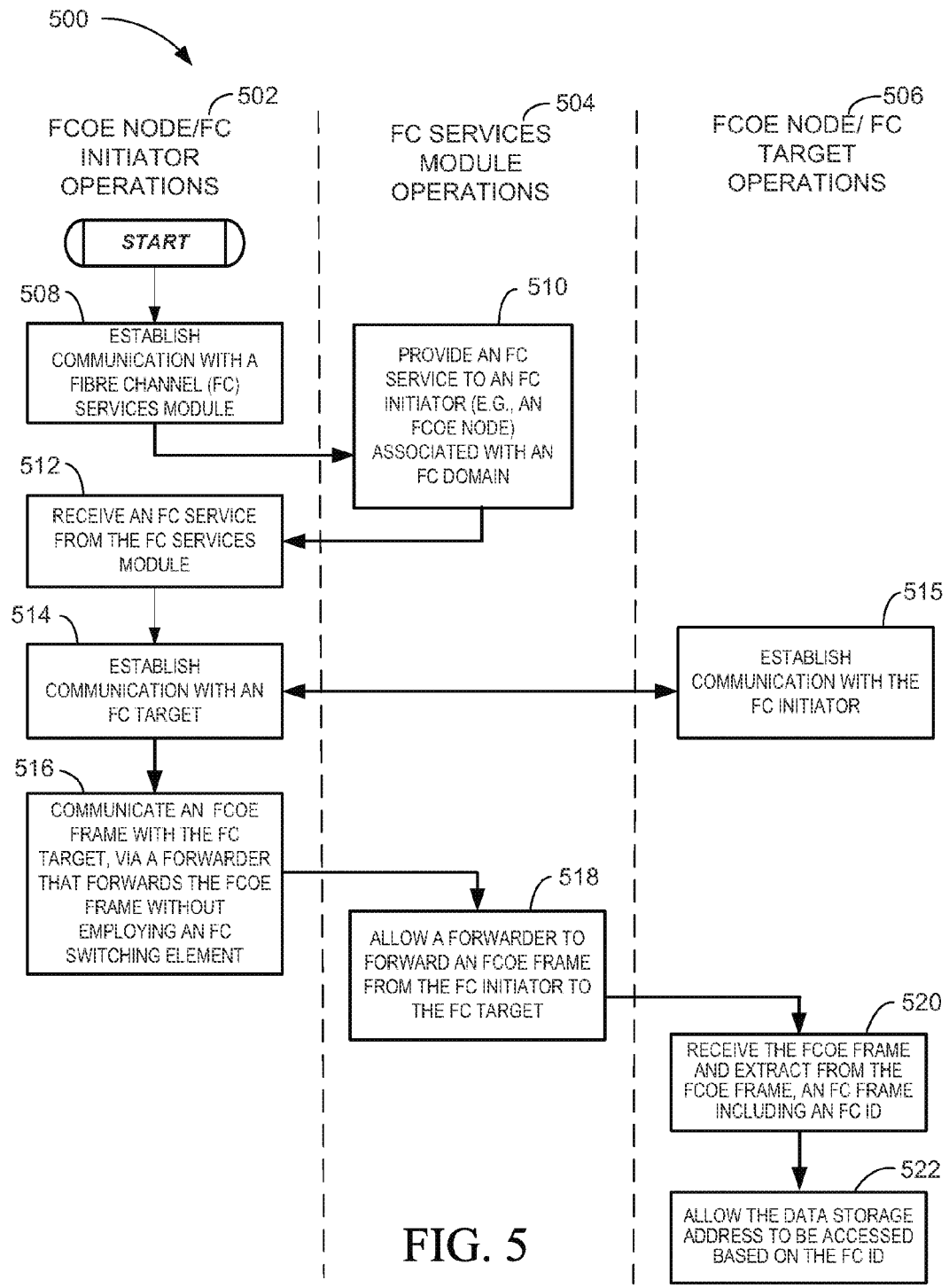
FIG. 5 is a flow diagram illustrating methods for requesting and providing FC services, in accordance with an example embodiment.

FIG. 5 is a flow diagram illustrating methods 500 for requesting and providing FC services, in accordance with an example embodiment. The methods 500 may be implemented as operations in the network connection arrangement 300 illustrated in FIG. 3 and, accordingly, they are described by way of example with reference thereto.

The operations are shown to include FCoE node (e.g., FC initiator) operations 502, FC services module operations 504, and FCoE node (e.g., FC target) operations 506. In an example embodiment, an FCoE node performing the FCoE node operations 502 may be substantially similar to the FCoE node 304 of FIG. 3; the FC services module performing the FC services module operations 504 may be substantially similar to the FC services module 316 of FIG. 3; and the FCoE performing the FCoE node operations 506 may be substantially similar to the FCoE node 312 of FIG. 3 or any other FC target associated with an FC ID.

At block 508, the FCoE node operations 502 may establish communication with an FC services module. Referring to FIG. 3, to establish communication, the FCoE node 304 may, in some example embodiments, follow the FCoE initialization protocol 403 shown in FIG. 4, which includes the FCoE node 304 multicasting a frame (operation 415) to the FCoE node 312 to receive a MAC address (operation 418) at which the login module 318 can be addressed. In response to the multicast frame (operation 415), the FCoE node may receive the MAC address of the FCoE node 312 (operation 418).

As shown in FIG. 3, the FCoE node 312 is an FCoE end node that is coupled to the machine 314. In an example embodiment, the machine 314 is a storage server that controls access to the data repository 320. The machine (e.g., the storage server) 314 may also operate the FC services module 316 to provide FC services 322 to FC nodes such as the FCoE node 304.

At block 510, the FC services module operations 504 may provide an FC service to an FCoE node associated with an FC domain. At block 512, the FCoE node operations 502 may receive an FC service from the FC services module.

Referring to FIG. 3, the FC services 322 provided by the FC services module 316 may include a domain name service, a state notification service, FC domain login service, or any other FC services. Providing the FC domain login service of issuing an FC ID to the FCoE node 304 (e.g., for an FCoE port) may be responsive to a fabric login command or a fabric discovery command received from the FCoE node 304. As described above, an FCoE port may be assigned a MAC address (operation 420) that corresponds to an FC ID assigned to the FCoE port by the login module 318.

At block 514, the FCoE node operations 502 establish communication with an FCoE node (e.g., the FC target), and at block 515 the FCoE node operations 506 establish communication with the requesting FCoE node (e.g., the FC initiator).

In example embodiments, establishing communication may include the FCoE node 304 of the machine 302 in FIG. 3 transmitting a port login command to the FCoE node 312 of the machine 314 (e.g. or any other FCoE node). FIG. 4 illustrates the establishment of communication with the transmission of an FC command (operation 422) by an FCoE port of the FCoE node 304 and the return of an FC command, directed to an assigned MAC address (operation 424), by an FCoE port of the FCoE node 312.

At block 516, the FC initiator operations 502 communicate an FCoE frame with the FCoE node, via a forwarder without using an FC switching element. Referring now to FIG. 3, the machine 302 may transmit an FCoE frame via the FCoE node 304 to the Ethernet switch 308, so that the FCoE frame can be received by the FCoE node 312 of the machine 314 (e.g., via forwarding by the Ethernet switch 308). It may be noted that the Ethernet switch of the operation 502 is not an FC switch and need not include an FC switching element.

At block 518, the FC services module operations 504 may allow a forwarder to forward an FCoE frame from one FCoE node (e.g., the FC initiator, such as FCoE node 304, FIG. 3) to another FCoE node (e.g., the FC target, such as FCoE node 312, FIG. 3).

Referring to FIG. 3, in example embodiments, the FCoE frame forwarded from the FCoE node 304 to the FCoE node 312 may include a data access command to access data stored by the data repository 320.

Referring again to FIG. 5, at block 520, the FCoE node/FC target operations 506 may receive the FCoE frame and extract an FC frame, including the data access command and the FC ID, from the FCoE frame. At block 522, the FCoE node/FC target operations 506 may allow access to the data storage address, based on the FC ID. In FIG. 3, the machine 314 (e.g., a storage server) controls access to the data repository 320, which may include an array of physical disks that are organized into one or more logical unit numbers 321. In an example embodiment, the FC ID within the FCoE frame corresponds to a particular logical unit number in data storage. In some example embodiments, the machine 314 is to allow or deny access to a logical unit number corresponding to the FC ID parsed from the FCoE frame.

Figure 6:
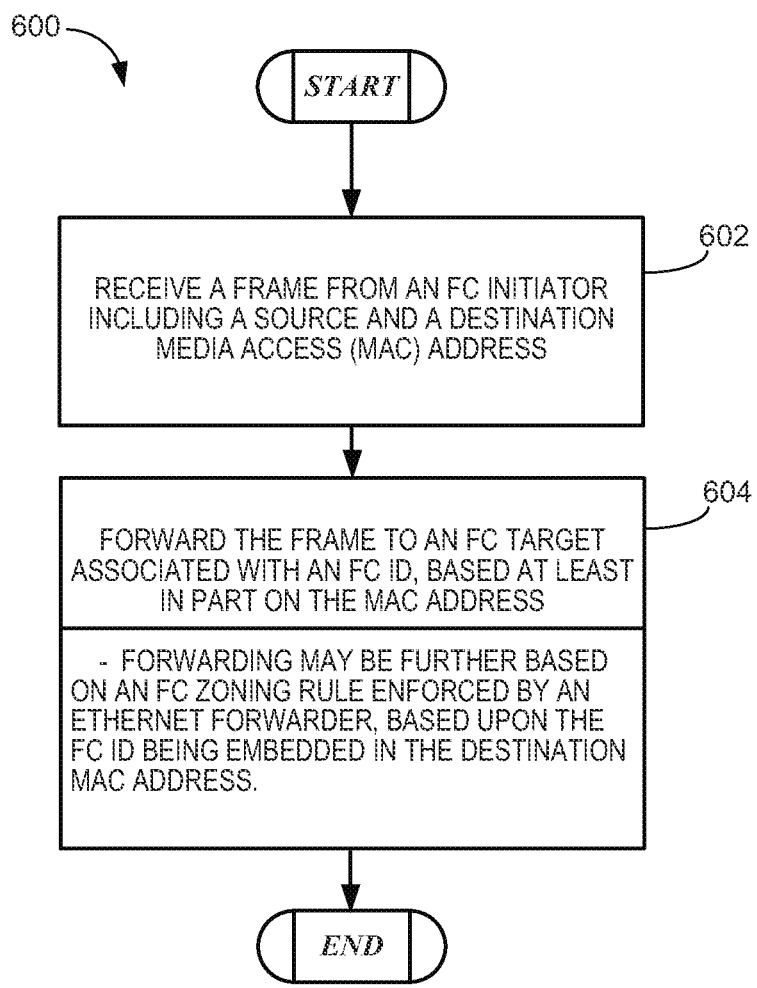
FIG. 6 is a flow diagram illustrating a method for forwarding an FCoE frame, in accordance with an example embodiment.

FIG. 6 is a flow diagram illustrating a method 600 for forwarding an FCoE frame, in accordance with an example embodiment. The method 600 for forwarding an FCoE frame may be deployed in the network connection arrangement 300 illustrated in FIG. 3 and, accordingly, it e thereto.

At block 602, the method 600 may receive from an FCoE node (e.g., FC initiator), a frame (e.g., an FCoE frame) including a source MAC address and a destination MAC address. In various example embodiments, the forwarder may be represented by the Ethernet switch 308 of FIG. 3. The Ethernet switch 308 may be communicatively coupled to and receive the frame from the FCoE node 304 via the transmission media 305. The Ethernet switch 308 may parse the frame to determine the MAC source and destination addresses.

At block 604, the method 600 may forward the frame to a further FCoE node (e.g., an FC target) associated with an FC ID, based at least in part on the destination MAC address included within the frame. Again referring to FIG. 3, the Ethernet switch 308 may forward the frame to the FCoE node 312 (e.g., the FC target) over the transmission media 305. In an example embodiment, the FCoE frame is communicated over Ethernet and may be forwarded by the Ethernet switch 308 based on MAC layer source and destination addresses. Although the source and destination MAC addresses may encode FC IDs (e.g., as described above), the Ethernet switch 308 may base forwarding on a 48-bit MAC address rather than 24-bit FC IDs. As such, some example embodiments may allow FCoE frames to be forwarded by an Ethernet switch (such as the Ethernet switch 304 referred to above).

It may be noted that FC zoning rules, which regulate FC frames based on FC IDs, may be mapped to access control entries ("ACEs") within an access control list ("ACL"), allowing FC zoning rules to be enforced upon FCoE frames based on their source and destination MAC addresses (e.g., that correspond to particular FC IDs). Thus, the Ethernet switch 308 may forward FCoE frames to an FCoE node that is an FC target further based on an FC zoning rule.

The example embodiments described herein may be implemented in software, hardware, or a combination thereof. For example, in some example embodiments, the methods described herein may be implemented by computer program products or software that may include a machine-readable or computer-readable storage medium having stored thereon instructions that may be used to program a computer (or other electronic devices). In other example embodiments, the functionality and methods described herein may be performed by specific hardware components (e.g., integrated circuits) that contain hardwired logic for performing the functionality, or by any combination of programmed computer components and custom hardware components.

Figure 7:
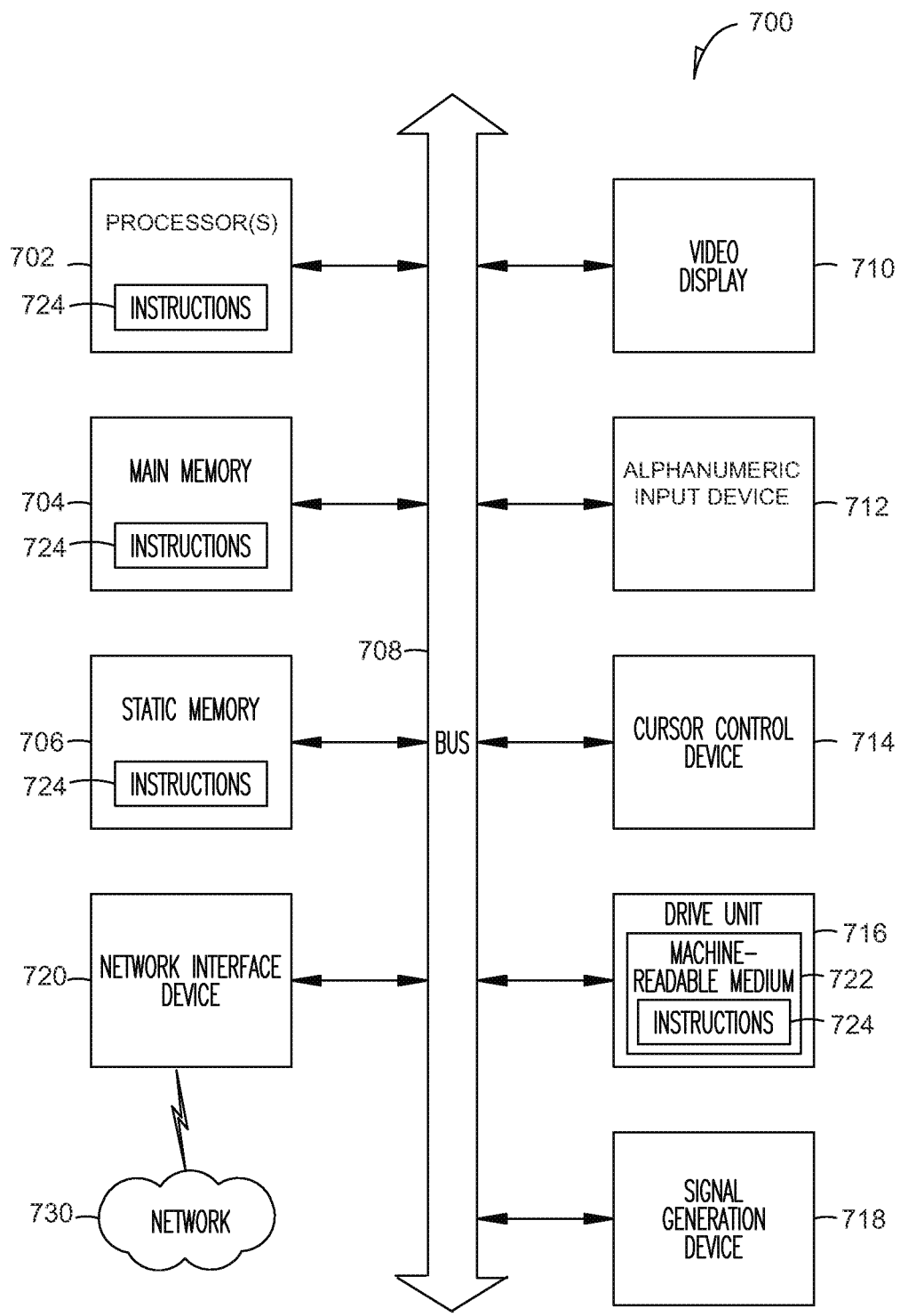
FIG. 7 shows a diagrammatic representation of a machine in an example form of a computer system for executing one or more of the embodiments disclosed herein.

FIG. 7 shows a diagrammatic representation of a machine in the example form of a computer system 700 that may implement any or all of the apparatus, equipment, and/or machines discussed by way of example, with reference to FIGS. 1 and 3 of the drawings. The computer system 700 may further execute instructions to perform one or more of the embodiments and operations disclosed by way of example, with reference to FIGS. 4, 5 and 6.

In alternative example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer ("PC"), a tablet PC, a set-top box ("STB"), a Personal Digital Assistant ("PDA"), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the embodiments discussed herein.

The example computer system 700 includes at least one processor 702 (e.g., a central processing unit, a graphics processing unit ("GPU") or both), a main memory 704 and a static memory 706, which communicate with each other via a bus 708. The computer system 700 may further include a video display unit 710 (e.g., a liquid crystal display ("LCD") or a cathode ray tube ("CRT")). The computer system 700 may also include a user interface ("UI"), such as an alphanumeric input device 712 (e.g., a keyboard) and/or a cursor control device 714 (e.g., a mouse). The computer system 700 may further include a disk drive unit 716, a signal generation device 718 (e.g., a speaker), and a network interface device 720.

The disk drive unit 716 may include a machine-readable medium 722 on which is stored one or more sets of instructions and data structures (e.g., instructions 724) embodying or utilized by any one or more of the embodiments or functions described herein. The instructions 724 may also reside, completely or at least partially, within the main memory 704, within the static memory 706, and/or within the processor(s) 702 during execution thereof by the computer system 700. The main memory 704, static memory 706, the drive unit 716, and the processor(s) 702 also constitute machine-readable media.

Utilizing any one of a number of well-known file transfer protocols ("FTPs"), the instructions 724 may further be transmitted or received over a network 730 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the embodiments of the subject matter disclosed herein, or that is capable of storing, encoding, or carrying data structures utilized by or associated with such a set of instructions. The term "machine-readable medium" shall accordingly be taken to include, but not be limited to, solid-state memories, optical and magnetic media, and carrier wave signals.

The above description is intended to be illustrative and not restrictive. For example, the above-described embodiments (or one or more aspects thereof) may be used in combination with each other. Other embodiments will be apparent to those of skill in the art upon reviewing the above description. The scope of the claimed subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended. That is, a system, device, article or process that includes elements in addition to those listed after such a term in a claim are still deemed to fall within the scope of that claim. Moreover, in the following claims, the terms "first," "second," and "third," etc. are used merely as labels, and they are not intended to impose numerical requirements on their objects.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Description of Example Embodiments, various features may be grouped together to streamline the disclosure. This should not be interpreted as intending that an unclaimed disclosed feature is essential to any claim. Rather, subject matter of one or more claims may lie in less than all features of a particular disclosed embodiment. Thus, the following claims are hereby incorporated into the Description of Example Embodiments, with each claim standing on its own as a separate embodiment.

What is claimed is:

1. An apparatus comprising:
   a first interface configured to be communicatively coupled, via a network, to a second interface and a fibre channel services module, the first interface configured to:
      receive a fibre channel service from the fibre channel services module, wherein the fibre channel service includes providing a media access control (MAC) address of the fibre channel services module;
      establish communication with the second interface;
      transmit a request to the fibre channel services module for the MAC address of the fibre channel services module;
      receive the MAC address of the fibre channel services module;
      transmit at least one of a fabric login command and a fabric discovery command to the MAC address of the fibre channel services module to request a source fibre channel ID and a source MAC address associated with the first interface;
      receive the source fibre channel ID and the source MAC address associated with the first interface;
      encode the source fibre channel ID within the source MAC address and a destination fibre channel ID within a destination MAC address, and include the source MAC address and the destination MAC address in a fibre channel over Ethernet (FCoE) frame, the destination fibre channel ID corresponding to a logical unit number identifying a storage array in data storage; and
      communicate the FCoE frame to the second interface, via a forwarder that forwards the FCoE frame without employing a fibre channel switching element.

2. The apparatus of claim 1, wherein the first interface is further configured to communicate a port login command to the second interface to establish communication with the second interface.

3. The apparatus of claim 1, wherein the first interface is configured to include a fibre channel frame within the FCoE frame, the fibre channel frame including the destination fibre channel ID corresponding to the logical unit number.

4. The apparatus of claim 3, wherein the data storage comprises a plurality of storage arrays, selected ones of which are identified by a corresponding plurality of fibre channel IDs including the destination fibre channel ID.

5. The apparatus of claim 1, wherein the second interface is an FCoE end node that is communicatively coupled to a machine configured to control access to data storage in a fibre channel domain that includes the first and second interfaces.

6. A method comprising:
  establishing communication with a fibre channel services module, wherein the establishing of communication with the fibre channel services module includes:
    transmitting a request to the fibre channel services module for a media access control (MAC) address of the fibre channel services module;
    receiving the MAC address of the fibre channel services module;
    transmitting at least one of a fabric login command and a fabric discovery command to the MAC address of the fibre channel services module to request a source fibre channel ID and a source MAC address; and
    receiving the source fibre channel ID and the source MAC address;
  receiving a fibre channel service from the fibre channel services module;
  establishing communication with a fibre channel over Ethernet (FCoE) port;
  encoding the source fibre channel ID within the source MAC address and a destination fibre channel ID within a destination MAC address, and including the source MAC address and the destination MAC address in an FCoE frame, the destination fibre channel ID corresponding to a logical unit number identifying a storage array in data storage; and
  communicating the FCoE frame to the FCoE port via a forwarder that is other than a fibre channel switching element.

7. The method of claim 6,
  wherein the establishing of communication with the FCoE port includes communicating a port login command to the FCoE port.

8. The method of claim 6, wherein the receiving of the fibre channel service from the fibre channel services module includes receiving one or more services selected from the group consisting of a domain name service, a state notification service, a fibre channel zoning service, and a fibre channel domain login service.

9. The method of claim 8, wherein receiving the fibre channel domain login service is responsive to requesting the destination fibre channel ID via at least one of a fabric login command and a fabric discovery command.

10. The method of claim 6, wherein the FCoE port is operated within an FCoE end node coupled to a storage server, and the fibre channel services module is operated by the storage server.

11. The method of claim 10, wherein the communicated FCoE frame includes a data access command and the destination fibre channel ID corresponding to the logical unit number, wherein the storage server is to allow access to the logical unit number responsive to the data access command.

12. The method of claim 11, wherein the data storage comprises a plurality of storage arrays, selected ones of which are identified by a corresponding plurality of fibre channel IDs including the destination fibre channel ID.

13. An apparatus comprising:
  a first interface configured to be communicatively coupled, via a network, to a second interface and a fibre channel services module, the first interface configured to:
    receive a fibre channel service from the fibre channel services module;
    establish communication with the second interface, wherein the establishing of communication with the second interface includes:
      transmitting a request to the fibre channel services module for a media access control (MAC) address of the fibre channel services module;
      receiving the MAC address of the fibre channel services module;
      transmitting at least one of a fabric login command and a fabric discovery command to the MAC address of the fibre channel services module to request a source fibre channel ID and a source MAC address associated with the first interface; and
      receiving the source fibre channel ID and the source MAC address associated with the first interface; and
    communicate a fibre channel over Ethernet (FCoE) frame to the second interface, via a forwarder to forward the FCoE frame without employing a fibre channel switching element;
  wherein the first interface is configured to encode the source fibre channel ID within the source MAC address and a destination fibre channel ID within a destination MAC address, and include the source MAC address and the destination MAC address in the FCoE frame, the destination fibre channel ID corresponding to a logical unit number identifying a storage array in data storage.

14. The apparatus of claim 13, wherein the first interface is further configured to communicate a port login command to the second interface to establish communication with the second interface.

15. The apparatus of claim 13, wherein the second interface is an FCoE end node that is communicatively coupled to a machine configured to control access to the data storage in a fibre channel domain that includes the first and second interfaces.

16. A system comprising:
  a fibre channel initiator within a fibre channel domain;
  a fibre channel target communicatively coupled to the fibre channel initiator, the fibre channel target being associated with a destination fibre channel identification (ID) within the fibre channel domain; and
  a fibre channel services module to:
    receive a request for a media access control (MAC) address of the fibre channel services module;
    transmit the MAC address of the fibre channel services module;
    receive at least one of a fabric login command and a fabric discovery command that requests a source fibre channel ID and a source MAC address associated with the fibre channel initiator;
    transmit the source fibre channel ID and the source MAC address associated with the fibre channel initiator;
    cause the fibre channel initiator to encode the source fibre channel ID within the source MAC address and the destination fibre channel ID within a destination MAC address, and include the source MAC address and the destination MAC address in a fibre channel over Ethernet (FCoE) frame, the destination fibre channel ID corresponding to a logical unit number identifying a storage array in data storage; and allow an Ethernet switch to forward the FCoE frame from the fibre channel initiator to the fibre channel target without employing a fibre channel switching element, the fibre channel target to allow access to a data storage address based on the destination fibre channel ID.

17. The system of claim 16, wherein the fibre channel services module is to provide one or more fibre channel services to the fibre channel initiator, wherein the fibre channel services are selected from the group consisting of a domain name service, a state notification service, a fibre channel zoning service, and a fibre channel domain login service.

18. The system of claim 16, wherein the fibre channel target is an FCoE end node interfacing a storage machine including the data storage address, and wherein the storage machine includes the fibre channel services module.

19. A method comprising:
providing a fibre channel service to a first fibre channel over Ethernet (FCoE) node associated with a fibre channel domain;
receiving a request for a media access control (MAC) address of a fibre channel services module;
transmitting the MAC address of the fibre channel services module;
receiving at least one of a fabric login command and a fabric discovery command that requests a source fibre channel ID and a source MAC address associated with the first FCoE node;
transmitting the source fibre channel ID and the source MAC address associated with the first FCoE node;
causing the first FCoE node to encode the source fibre channel ID within the source MAC address and a destination fibre channel ID within a destination MAC address, and to include the source MAC address and the destination MAC address in an FCoE frame, the destination fibre channel ID corresponding to a logical unit number identifying a storage array in data storage;
allowing an Ethernet switch to forward the FCoE frame from the first FCoE node to a second FCoE node without employing a fibre channel switching element;
receiving the FCoE frame at the second FCoE node and extracting from the FCoE frame the destination fibre channel ID; and
allowing access to a data storage address based on the destination fibre channel ID.

20. The method of claim 19, wherein the providing of the fibre channel service to the first FCoE node includes providing one or more services selected from the group consisting of a domain name service, a state notification service, a fibre channel zoning service, and a fibre channel domain login service.

21. An apparatus, comprising:
an Ethernet forwarder configured to be coupled with a fibre channel initiator and a fibre channel target, via a network, the Ethernet forwarder configured to:
receive, from the fibre channel initiator, a fibre channel over Ethernet (FCoE) frame including a destination media access control (MAC) address associated with the fibre channel target and a destination fibre channel ID encoded in the destination MAC address, the destination fibre channel ID corresponding to a logical unit number identifying a storage array in data storage; and
forward the frame to the fibre channel target without employing a fibre channel switching element, based at least in part on the destination MAC address,
wherein the fibre channel initiator is configured to:
transmit a request to the fibre channel target for the MAC address of the fibre channel target;
receive the MAC address of the fibre channel target;
transmit at least one of a fabric login command and a fabric discovery command to the MAC address of the fibre channel target to request a source fibre channel ID and a source MAC address associated with the fibre channel initiator; and
receive the source fibre channel ID and the source MAC address associated with the fibre channel initiator.

22. The apparatus of claim 21, wherein the Ethernet forwarder is configured to forward the frame to the fibre channel target further based on a fibre channel zoning rule enforced by the Ethernet forwarder, wherein the Ethernet forwarder is configured to enforce the fibre channel zoning rule based on the destination fibre channel ID encoded in the destination MAC address.

23. A method comprising:
on an Ethernet forwarder that does not include a fibre channel switching element:
receiving a fibre channel over Ethernet (FCoE) frame from a fibre channel initiator, the frame including a destination media access control (MAC) address and a destination fibre channel ID encoded in the destination MAC address, the destination fibre channel ID corresponding to a logical unit number identifying a storage array in data storage; and
forwarding the frame to a fibre channel target associated with the destination fibre channel ID, based at least in part on the destination MAC address,
wherein the fibre channel initiator is further configured to:
transmit a request to the fibre channel target for the MAC address of the fibre channel target;
receive the MAC address of the fibre channel target;
transmit at least one of a fabric login command and a fabric discovery command to the MAC address of the fibre channel target to request a source fibre channel ID and a source MAC address associated with the fibre channel initiator; and
receive the source fibre channel ID and the source MAC address associated with the fibre channel initiator.

24. The method of claim 23, wherein the forwarding of the frame to the fibre channel target is further based on a fibre channel zoning rule enforced by the Ethernet forwarder, wherein the fibre channel zoning rule is enforced based on the destination fibre channel ID being encoded in the destination MAC address.

25. A non-transitory computer-readable storage medium having embodied thereon instructions executable by one or more machines to perform operations comprising:
providing a fibre channel service to a first fibre channel over Ethernet (FCoE) node associated with a fibre channel domain;
receiving a request for a media access control (MAC) address of a fibre channel services module;
transmitting the MAC address of the fibre channel services module;
receiving at least one of a fabric login command and a fabric discovery command that requests a source fibre channel ID and a source MAC address associated with the first FCoE node;

transmitting the source fibre channel ID and the source MAC address associated with the first FCoE node;

causing the first FCoE node to encode the source fibre channel ID within the source MAC address and a destination fibre channel ID within a destination MAC address, and to include the source MAC address and the destination MAC address in an FCoE frame, the destination fibre channel ID corresponding to a logical unit number identifying a storage array in data storage;

allowing an Ethernet switch to forward the FCoE frame from the first FCoE node to a second FCoE node without employing a fibre channel switching element;

receiving the FCoE frame at the second FCoE node and extracting from the FCoE frame the destination fibre channel ID; and allowing access to a data storage address based on the destination fibre channel ID.

* * * * *